United States Patent
Thomas

(10) Patent No.: US 7,025,166 B2
(45) Date of Patent: Apr. 11, 2006

(54) LIGHT WEIGHT INTEGRATED BODY/CHASSIS STRUCTURE FOR ROAD OR RAIL VEHICLE

(76) Inventor: Sean Thomas, 2041 Western Village La., Houston, TX (US) 77043

( * ) Notice: Subject to any disclaimer, the term of this patent is extended or adjusted under 35 U.S.C. 154(b) by 176 days.

(21) Appl. No.: 09/956,778

(22) Filed: Sep. 20, 2001

(65) Prior Publication Data
US 2002/0033299 A1 Mar. 21, 2002

Related U.S. Application Data

(60) Provisional application No. 60/234,085, filed on Sep. 20, 2000.

(51) Int. Cl.
*B62D 21/00* (2006.01)
(52) U.S. Cl. .............. 180/311; 180/312; 280/781; 296/181.2; 296/187.01; 296/191; 296/203.01; 296/205; 296/901.01
(58) Field of Classification Search ......... 180/311, 180/312; 280/781, 785; 296/187.01, 205, 296/181.2, 901.01, 191, 203.01
See application file for complete search history.

(56) References Cited

U.S. PATENT DOCUMENTS

| | | | |
|---|---|---|---|
| 4,254,987 A | | 3/1981 | Leonardis |
| 4,491,362 A | * | 1/1985 | Kennedy ............... 296/181.2 |
| 4,773,701 A | | 9/1988 | Messori |
| 5,002,309 A | | 3/1991 | Vecellio |
| 5,577,793 A | | 11/1996 | Kobasic |
| 5,797,646 A | | 8/1998 | Jeunehomme et al. |
| 5,863,070 A | | 1/1999 | Williams et al. |
| 5,897,139 A | * | 4/1999 | Aloe et al. ............... 280/781 |
| 5,934,739 A | | 8/1999 | Waldeck |
| 5,997,075 A | | 12/1999 | Dunder et al. |

FOREIGN PATENT DOCUMENTS

| | | | | |
|---|---|---|---|---|
| BE | 498133 | * | 1/1951 | ......... 296/203.01 |
| EP | 76934 | * | 4/1983 | ......... 296/203.01 |
| EP | 523831 | * | 1/1993 | ............. 296/901 |
| GB | 2088792 | * | 6/1982 | ............ 296/181.2 |

OTHER PUBLICATIONS

Project Vantage, Sports Car International, Aug./Sep. 1998.
R. King, Synthesis of Transit Practice 2—Low-Floor Transit Buses, 1994, Transit Cooperative Research Program.

* cited by examiner

*Primary Examiner*—Eric Culbreth
(74) *Attorney, Agent, or Firm*—Fulbright & Jaworski, LLP; Michael S. McCoy

(57) ABSTRACT

The present invention relates to a road or rail vehicle comprised of a lightweight perimeter frame with panel-like elements, which define a floor, a roof, side walls, and front and rear end elements. In this design the panels are made from high-strength materials wherein the panels are the primary structural elements and the perimeter frame is used primarily as a means of attaching the panels. However, the perimeter chassis is reinforced with heavier sections in certain areas to distribute concentrated forces and impact loads into the structural panels from the vehicle suspension, powertrain, doors, seating, and major access panels or hatches. The body/chassis structure is configured with front and rear chassis subcomponents to which all suspension, steering, engine, and powertrain elements are mounted, in a manner to allow the entire sub-assemblies at the front and rear of the vehicle to be easily installed and removed from the chassis structure.

34 Claims, 6 Drawing Sheets

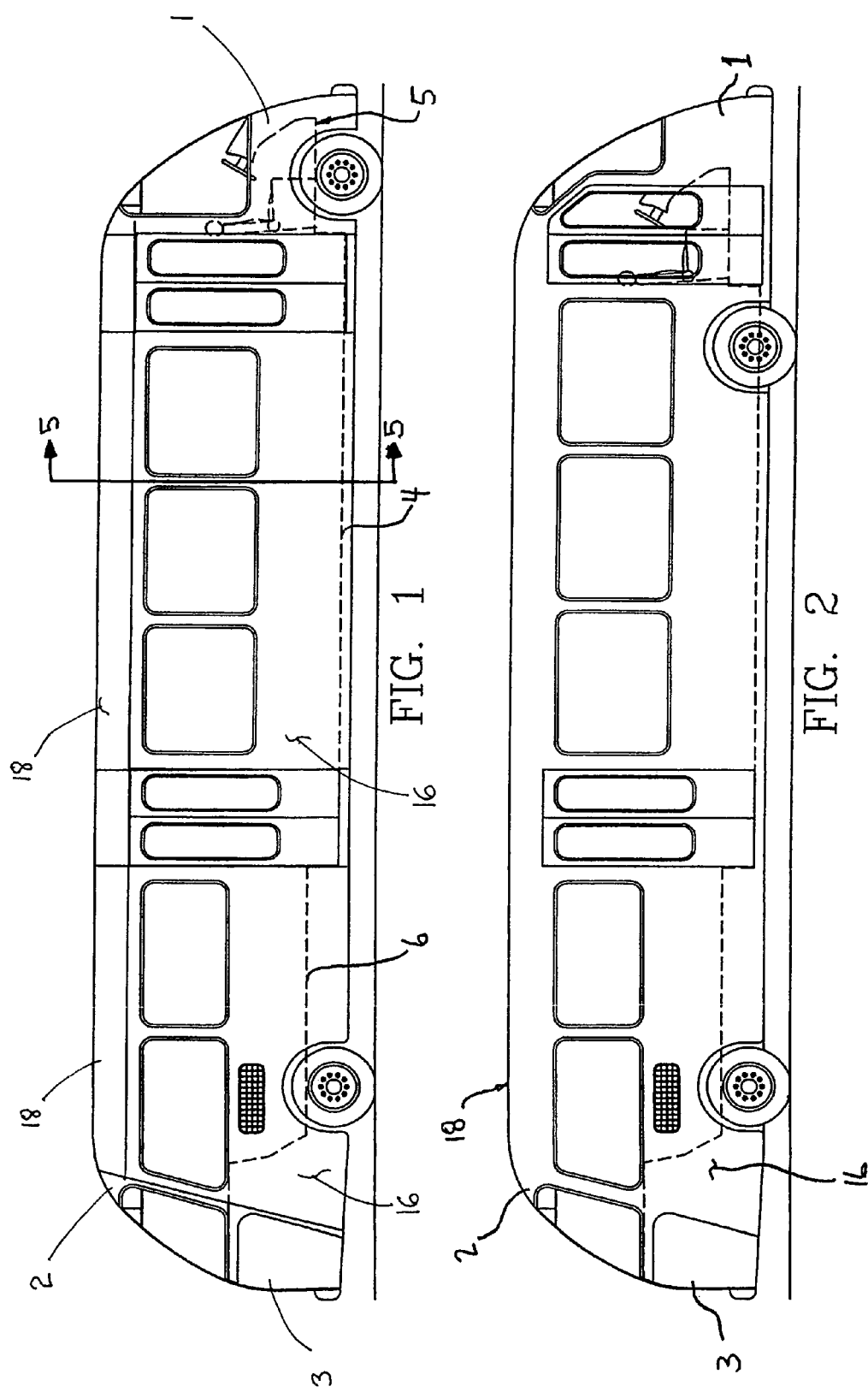

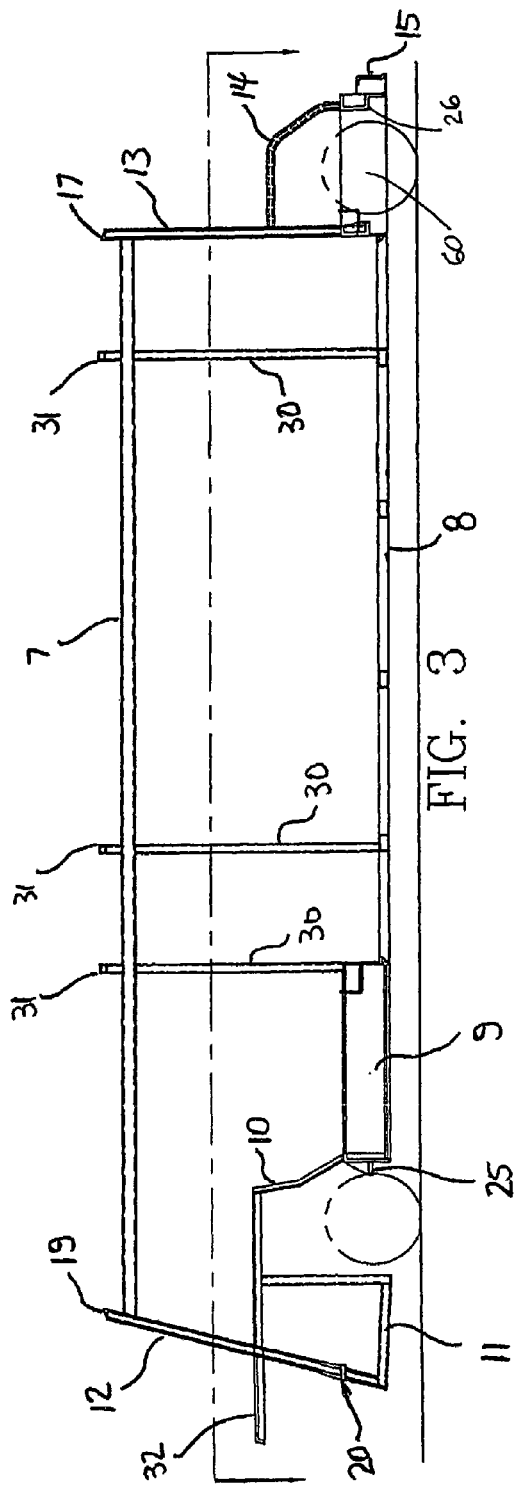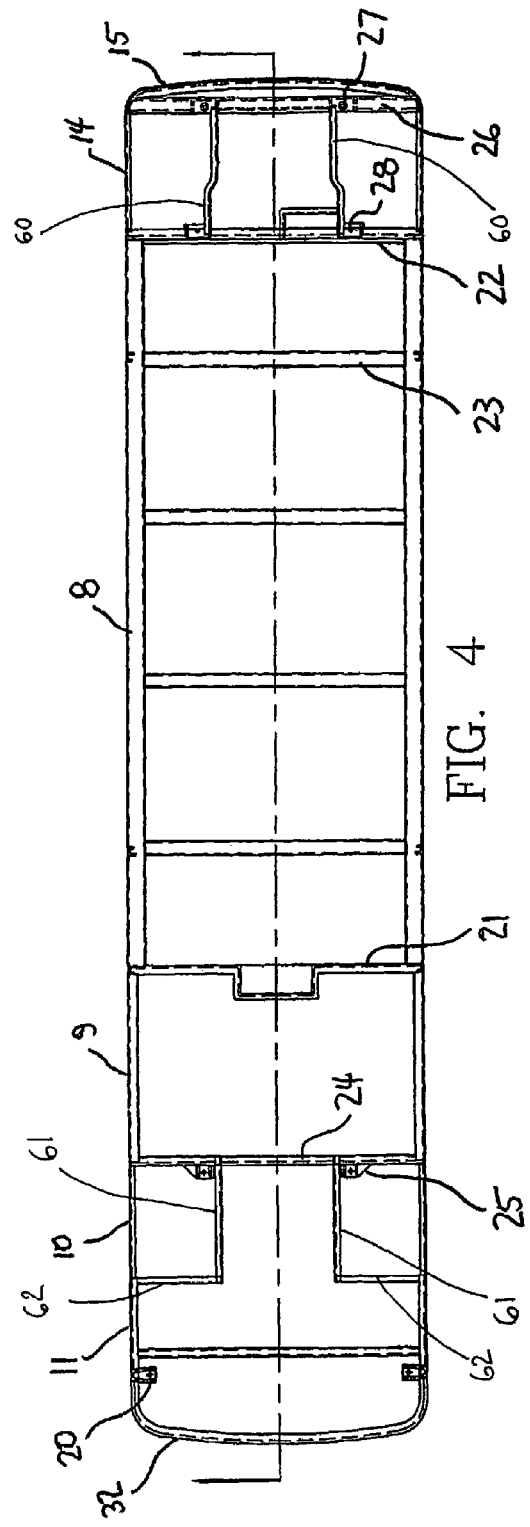

LIGHT WEIGHT INTEGRATED BODY/CHASSIS STRUCTURE FOR ROAD OR RAIL VEHICLE

This application claims the benefit of provisional application Ser. No. 60/234,085, filed Sep. 20, 2000, and is incorporated herein for all purposes.

FIELD OF INVENTION

This invention relates to large road and rail vehicle structures, such as buses, motor homes, and rail cars, constructed out of lightweight metals and composite materials. Additionally, this invention relates to using modularized suspension and powertrain components in large road or rail vehicles.

BACKGROUND OF THE INVENTION

One type of long wheelbase, heavy vehicle design is manufactured using a body-on-frame configuration in which two large steel longitudinal beams run nearly the full length of the vehicle. The engine, drivetrain and suspension are mounted to the longitudinal beams. A separate, lightweight passenger compartment, extending most or all of the length of the vehicle is mounted on top of the longitudinal beams. In this configuration, the passenger compartment does not contribute substantial strength to the frame of the vehicle. The floor of the passenger compartment sits on top of the longitudinal beams, with the vehicle floor being relatively unobstructed by intrusions from the running gear. This configuration is known as a high-floor design.

High-floor design vehicles typically have floor heights of 32 or more inches above ground level, requiring at least two steps from the ground to the passenger area, making access difficult for handicapped persons, elderly patrons, and children. Even when high-floor designs are constructed with wheelchair lifts, accessibility is difficult and time-consuming. The high-floor designs are characterized by heavy vehicle weight due to the longitudinal beams, which are nearly always made out of steel.

Another type of high floor design integrates the chassis and the body. In this configuration, frame members for attaching the body panels reinforce and strengthen the longitudinal beams. Although the two longitudinal beams may be lightened somewhat in this integrated design, they are still present and serve as the primary load-bearing members of the vehicle.

A more recent design in use in the large vehicle industry is called a low-floor design. In the low-floor design the floor height is typically 14 to 15 inches above the ground, eliminating most requirements for steps into the vehicle. Low-floor designs are structurally similar to high-floor designs in that the low-floor designs also use longitudinal beams as the primary load-bearing members. However, due to the requirement for a low floor height, these designs are often constructed with relatively small beams (or tubes) in the floor. To provide adequate chassis strength, the floor beams may be reinforced with large roof-mounted longitudinal beams. Another variation integrates the floor beams with a large number of relatively small beams in the roof and/or the side walls, also known as space-frame construction. In these designs, the exterior metal body panels provide a very limited contribution of strength to the steel frame members.

A major drawback of low-floor designs is that they generally suffer a substantial loss of seating capacity due to the intrusion of suspension and drivetrain components into the passenger area. Another drawback of low-floor designs is that they are heavier than many high-floor buses due to the additional complexity of the chassis and the drivetrain.

A common feature for existing long wheelbase, heavy vehicle designs is the heavy longitudinal beams or tubular sections that are the primary structural members of the chassis. Nearly all large vehicles, both low-floor and high floor designs feature two or more longitudinal beams or tubular sections, either continuous in length or composed from individual sections, which serve as the primary load-bearing members for carrying powertrain, suspension, vehicle body, and/or passenger loads. For all of these vehicles, the exterior body panels contribute a very limited amount of structural strength.

The most recent development for large vehicles is the use of non-metallic body panels to reduce weight and corrosion. The body panels for these vehicles are generally constructed from fiber-reinforced plastics, also known as FRP's or as "composite" materials. Like the metal-bodied vehicles, composite variations nearly always utilize body panels of limited structural strength, deriving nearly all chassis structural strength from the longitudinal and lateral metal beams and/or tubular frame members.

SUMMARY OF THE INVENTION

An object of this invention is to provide an integrated body/chassis structure for a long-length road or rail vehicle with a substantial reduction in weight compared to prior art vehicles, while meeting or exceeding lifespan and durability requirements.

The present invention incorporates the following features:

a perimeter frame for a long, low-floor vehicle which roughly defines the twelve edges of the vehicle, to which light weight, high-strength panels are affixed to serve as the primary structural members connecting the front suspension to the rear suspension, wherein these panels have the structural capacity to carry these loads in the absence of a conventional frame, in contrast to prior art vehicles which require two or more longitudinal structural frame members to connect the front and rear suspensions a vehicle in which the perimeter frame is heavily reinforced in certain areas to distribute heavy forces and impact loads into the structural panels from the vehicle suspension, drivetrain, doors, seating units, and major access panels or hatches reinforcement of the perimeter frame where necessary with heavier sections or additional frame members to support any concentrated forces or impact loads which are transferred from the powertrain, suspension, vehicle body, seating, or passenger payload a raised floor near the front and the rear of the vehicle to accommodate the vehicle suspension, powertrain, and/or fuel storage, while providing improvements in useable floor-space over most low-floor designs for increased passenger seating.

a vehicle structure that can be manufactured with a reduced number of components to reduce the complexity and cost of the body/chassis unit.

a vehicle in which body panels can serve as both the exterior and interior surface of the vehicle a vehicle in which a suspension module, hereafter known as a "suspension module", is mounted to the chassis in a manner that allows easy installation and removal of the module a vehicle in which the engine, drivetrain, and suspension unit form a complete sub-assembly, hereafter known as a "powertrain module", which is mounted to the chassis as a single unit at one end of the vehicle, in a manner that allows easy installation and removal of the module.

An Embodiment of the invention is a vehicle structure, comprising a lightweight skeletal frame with a plurality of body panels attached to the skeletal frame wherein the body panels are constructed from a light weight non-metallic material.

In a further embodiment of the vehicle structure the body panels comprise a first skin, a second skin, and a core disposed therebetween.

In a further embodiment of the vehicle structure the core comprises a honeycomb structure.

In a further embodiment of the vehicle structure the core constructed from balsa wood or foam.

In a further embodiment of the vehicle structure incorporates the first skin is reinforced with a material selected from the group consisting of aluminum, fiberglass, aramid, ultra-high molecular weight polyethylene sold under the trademark "SPECTRA", carbon fiber, other known structural fibers, and any combination thereof.

In a further embodiment of the vehicle structure the lightweight skeletal frame distributes stress loads to the plurality of body panels wherein the body panels are attached to the skeletal frame.

In a further embodiment of the vehicle structure the body panels are the primary load bearing members of the structure.

In a further embodiment of the vehicle structure the skeletal frame is reinforced in areas of high stress loads.

In a further embodiment of the vehicle structure the skeletal frame is reinforced around suspension and powertrain attachment points.

In a further embodiment of the vehicle structure the skeletal frame has at least one attachment point for removably attaching a first suspension module.

In a further embodiment of the vehicle structure the skeletal frame has at least one attachment point for removably attaching a powertrain module.

In a further embodiment of the vehicle structure the skeletal frame has at least one suspension attachment point in the forward portion of said skeletal frame for removably attaching a first suspension module and at least one suspension attachment point in the aft portion of said skeletal frame for removably attaching a second suspension module.

Another embodiment of the present invention is a suspension module, comprising a suspension module frame for housing a suspension system, wherein said suspension module frame contains a plurality of mounts for releaseably attaching the suspension module frame to a vehicle structure.

In a further embodiment of the suspension module the plurality of mounts are spaced to distribute loads proportionally to said vehicle structure.

In a further embodiment of the suspension module the suspension module frame distributes suspension loads to the vehicle structure.

Another embodiment of the present invention is a suspension module, comprising a suspension module frame member, a suspension arm, a spring, a shock absorber, and a wheel, wherein said suspension arm is operably associated with the spring and shock absorber and is rotationally coupled to said suspension module frame member, wherein said wheel is pivotally coupled to said suspension arm.

Another embodiment of the present invention is a powertrain module comprising a powertrain module frame for housing a suspension system and an engine, wherein the powertrain module frame contains a plurality of mounts for releaseably attaching the powertrain module frame to a vehicle structure.

In a further embodiment of the powertrain module the plurality of mounts are spaced to distribute loads proportionally to said vehicle structure.

In a further embodiment of the powertrain module the powertrain module frame distributes suspension and powertrain loads to the vehicle structure.

Another embodiment of the present invention is a powertrain module comprising a powertrain frame member, a suspension arm, a strut, an engine, a drive axle, a wheel, and a transmission, wherein the suspension arm is in a fixed relation to the strut and is rotationally coupled to the powertrain frame member and rotationally coupled to said drive axle, wherein the drive axle is connected on a first end to the wheel and connected on a second end to the transmission, wherein said transmission is connected to said engine.

Another embodiment of the present invention is a vehicle comprising a body, an engine, and a suspension module, wherein said engine is secured to said body, wherein said suspension module is releaseably attached to said body.

In a further embodiment of the vehicle the suspension module houses a suspension system.

Another embodiment of the present invention is a vehicle comprising a body, a suspension module, and a powertrain module, wherein the suspension module and the powertrain module are releaseably attached to the body.

In a further embodiment of the present invention the suspension module houses a suspension system.

In a further embodiment of the present invention the powertrain module houses engine and a suspension system.

BRIEF DESCRIPTION OF THE DRAWINGS

The advantages, features, and details of the invention are explained in greater detail in the following description of the preferred embodiment, with the aid of drawings as listed below.

FIG. 1 is a side view showing the exterior of the vehicle, with the floor shown as hidden lines.

FIG. 2 is another exterior side view showing the layout with the optional front drivetrain, with a convention bus layout where the driver and the front entry door are both ahead of the front wheels.

FIG. 3 is a side view of the body/chassis structure with the body panels removed to reveal the skeleton frame, which defines the perimeter of the vehicle.

FIG. 4 is a top view of the body/chassis structure with the body panels removed to reveal the perimeter frame.

DETAILED DESCRIPTION OF THE INVENTION

Figure 5:
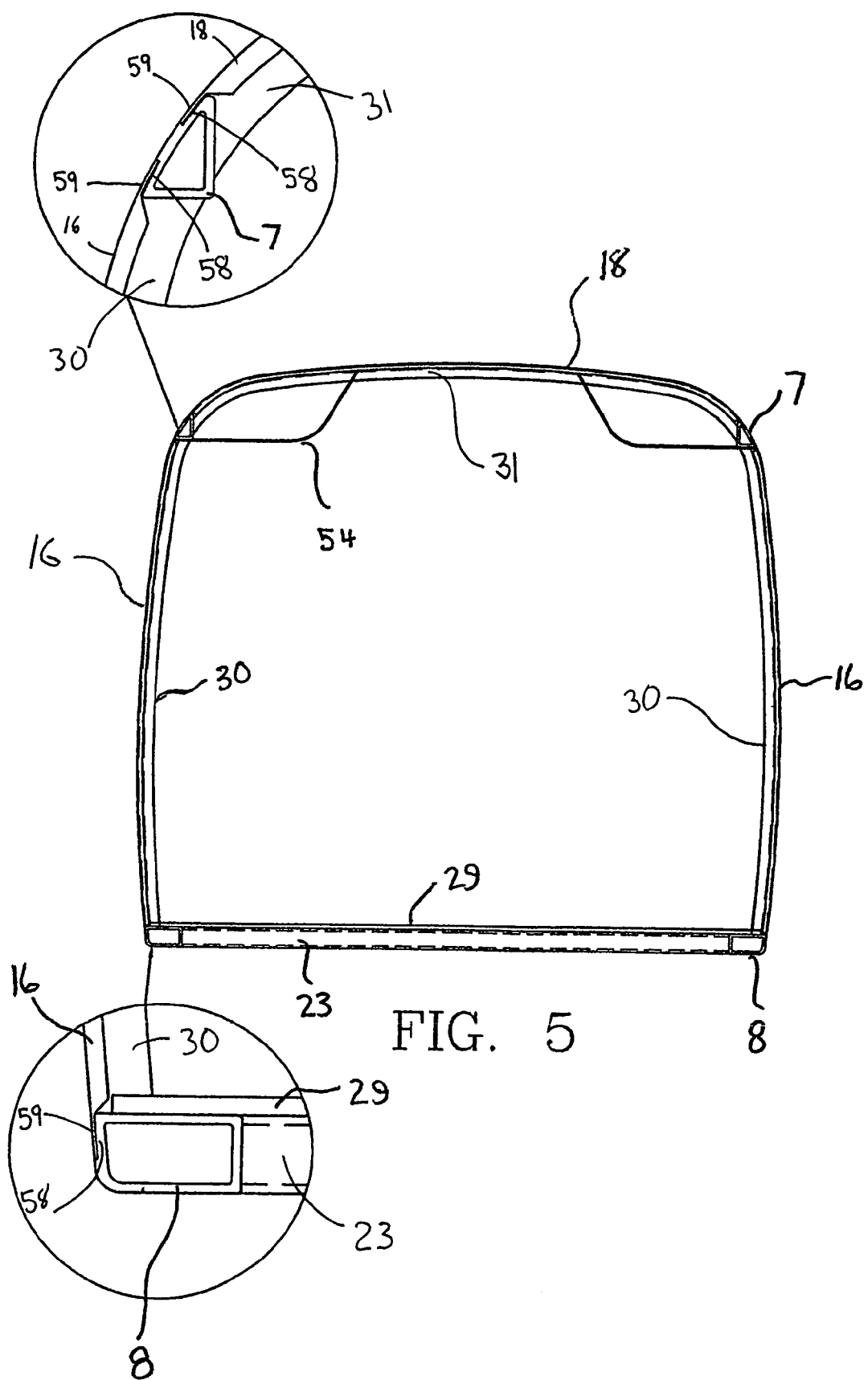
FIG. 5 is a cross-sectional view taken from FIG. 1 showing the perimeter frame and the body panels.

This invention relates to large road and rail vehicle structures, such as buses, motor homes, or rail cars, constructed out of lightweight metals and composite structures. Additionally, this invention relates to using modularized suspension and power train components in large road and rail vehicles. Although the drawings depict a bus, this invention may be applied to other large road and rail vehicles.

Referring to the drawings to explain the preferred embodiment of the invention, FIG. 1 is a side view of a motor bus exterior which shows the exterior shape that is defined by the skeletal frame and body panels. The body panels are attached to the skeletal frame. A given side may have a single panel 16 that spans its entire length or it may have multiple panels that span its entire length. If more than one panel is used on a given side, the edge of the panel may be attached to an additional skeletal frame element or another panel.

The front end body panel 1 visibly defines the shape of the front of the vehicle, as does the rear body panel 2, with the lower rear section 3 hinged for engine access.

The floor of the vehicle is shown in this view with a hidden line to clearly show the low floor 4 from the front entry door to the rear door, the raised floor at the front 5 to accommodate the front suspension module, and the raised floor at the rear 6 of the vehicle to accommodate the rear suspension and powertrain module.

The drawing in FIG. 2 is a second view of a motor bus exterior which shows an optional front suspension layout, where the front wheels are located to the rear of the driver and the front entry door.

The drawing in FIG. 3 is a side view of the skeletal frame with the body panels, the front module, and the rear module removed to show the bare skeletal frame, including the reinforcements for mounting the suspension and powertrain modules. This detail shows tubular sections 7 (upper longitudinal frame members), 8 (lower longitudinal frame members) that extend through the central section of the frame, defining the four longitudinal edges of the vehicle.

The upper longitudinal frame members 7 are constructed with a constant tubular cross-section that extends nearly the full length of the vehicle.

The lower longitudinal frame members 8 and 9 may be constructed using two different tubular cross-sections between the front and rear wheels, with a short tubular section 8 (lower longitudinal frame member) along the low floor, and a tall tubular section 9 (lower longitudinal frame member) supporting the raised floor just ahead of the rear wheels. The lower longitudinal frame is further extended over each wheelwell by using frame extensions made intact as a casting, or formed or fabricated from open shapes or tubular sections. These special shapes may be rounded or angular. Angular shapes are shown in FIG. 3. At the rear of the vehicle, the frame extensions 10 over each wheelwell connect to a short longitudinal tubular section 11 that extends the last distance to the upright frame member 12 located near each rear corner of the vehicle. Inside the wheelwell, two aft longitudinal inner subframe members 61 connect the rearward crossmember 24 to the short longitudinal tubular sections 11 through aft short lateral subframe members 62.

In the standard front wheel layout, shown in FIG. 3, the upright frame members 13 at the front of the vehicle are mounted just behind the front wheels, near the base of the two frame members 14, which extend over the top of the wheelwells. The two front wheelwell frame members are connected at the front of the vehicle to an arched lateral crossmember 15 which supports the lower edge of the front end body panel 1.

The upright frame member 12, which defines the shape of the side panel 16 and the line at which it ends, joins the side panel 16 to the end body panel 2. The upright frame members 12 on either side of the bus are connected by a lateral section 19, which connects the roof panel 18 to the end panel 2. The two upright members 12 and the lateral frame member 19 are joined together to form a single hoop element. This hoop element can be manufactured with an open cross-section as a single piece casting, or formed or fabricated from one or more linear sections with an open cross-section or a tubular shape. The hoop element at the rear of the vehicle has additional elements 20 to create two mounting points for the rear powertrain module.

As shown in FIG. 5 and FIG. 4, in between the front and rear wheels, the longitudinal tubular sections are connected to lateral crossmembers 21, 22 to support the floor panels 29. The weight of the passengers along the length of the floor is supported at each end of each panel, and may have additional lateral cross-members 23 as shown to provide further support and reinforcement.

The perimeter frame has one or more lateral crossmembers which are joined to the two tall tubular sections 9 (lower longitudinal frame member) which define the raised rear floor. In this specific embodiment, the two tubular sections combine with the crossmembers 21, 24 to form a structural box, within which cylindrical tanks may be mounted for fuel storage. In this variation, the forward crossmember 21 has a passenger step to the raised rear floor as an integral feature. The rearward crossmember 24 has additional reinforcements to provide two mounting points 25 for the rear powertrain module.

The standard front suspension configuration, as shown in FIG. 1, has a lateral crossmember 22 (lateral forward subframe member) at the bottom of the front frame hoop, which defines the raised floor at the front of the vehicle, also having an integrated step to access the driver's seat. This crossmember also has two mounting points 28 for attaching the front suspension module. A second crossmember 26 (lateral forward subframe member) is mounted ahead of the front wheels, which mounts to the perimeter frame where the shorter front lateral crossmember 15 meets the two front wheelwell frame members 14. This forward crossmembers has additional reinforcements to also provide two mounting points 27 for the front suspension module. The standard front suspension configuration further includes longitudinal forward sub-frame members 60.

As seen in the FIG. 5, the primary longitudinal tubular sections are extruded shapes, which have mounting surfaces 58 for bonding the flange 59 of the body panels. The body panels may be bonded to the longitudinal tubular sections using any known high strength bonding material and method.

The upper tubular section 7 (upper longitudinal frame member) is similar to the lower longitudinal tubular section 8 (lower longitudinal frame member) except that it has an additional mounting surface 58 for mounting the roof panel 18. The roof panel is attached to the upper tubular section 7 (upper longitudinal frame member) in the same way that the side panel 16 is attached to the lower tubular section (lower longitudinal frame member).

Although mechanical reinforcements are unnecessary, fasteners like screws or rivets can be used to provide additional strength and to improve the long-term integrity of these bonded joints.

Another feature which is visible in FIG. 5 are the utility tubes 54, which are suspended inside the passenger compartment. The utility tubes are shown mounted to the upper longitudinal tubes. The utility tubes are non-structural elements that provide space for lighting, air conditioning and heating equipment and ducting, electrical wiring, or possibly even luggage. Additional space can be provided for wiring and supply hoses or tubing through openings in the frame members under the floor.

The perimeter frame has additional vertical elements 30, which define the entry doors to provide hard mounting points for door loads. The frame has additional lateral frame members 31 arching up between the upper longitudinal tubes 7, to which shorter roof panel elements may be mounted, which also serve as a mounting point for roof-mounted emergency escape hatches.

The perimeter frame has a lateral arched crossmember 32 at the very rear of the vehicle to which the lower edge of the rear end body panel is mounted. This lateral frame member connects at each side to the elements of the rear frame hoop 12, 19, and serves as the mounting surface for the engine access hatch 3.

The perimeter frame may have additional vertical elements 30 or lateral crossmembers 31 and 32, thus dividing an unsupported opening and replacing one-body panel with two shorter body panels.

The preferred material used to construct the perimeter frame is lightweight metal, reinforced as noted. Specifically, the lightweight metal may be aluminum, light gage steel, or thin-wall stainless steel. However, all or portions of the perimeter frame may also be constructed using non-metallic components.

The metal used should also corrosion resistant. Therefore, use of aluminum or stainless steel is favored over carbon steel.

The tubular shapes and open sections which compose the individual frame components may be joined by welding, bonding, bolting, or any other suitable means.

The body panels may range from as little as ⅛ of an inch thick to more than an inch thick, with the exterior panels typically ranging from ⅜ of an inch to 1¼ inches *thick*. T*hese* panels are manufactured to provide both high strength and low *weight*. T*his* design can be achieved with a homogeneous *material*, but is most often achieved using a bonded assembly such as a lightweight core material enclosed between two *high-strength skins*.

Figure 10:
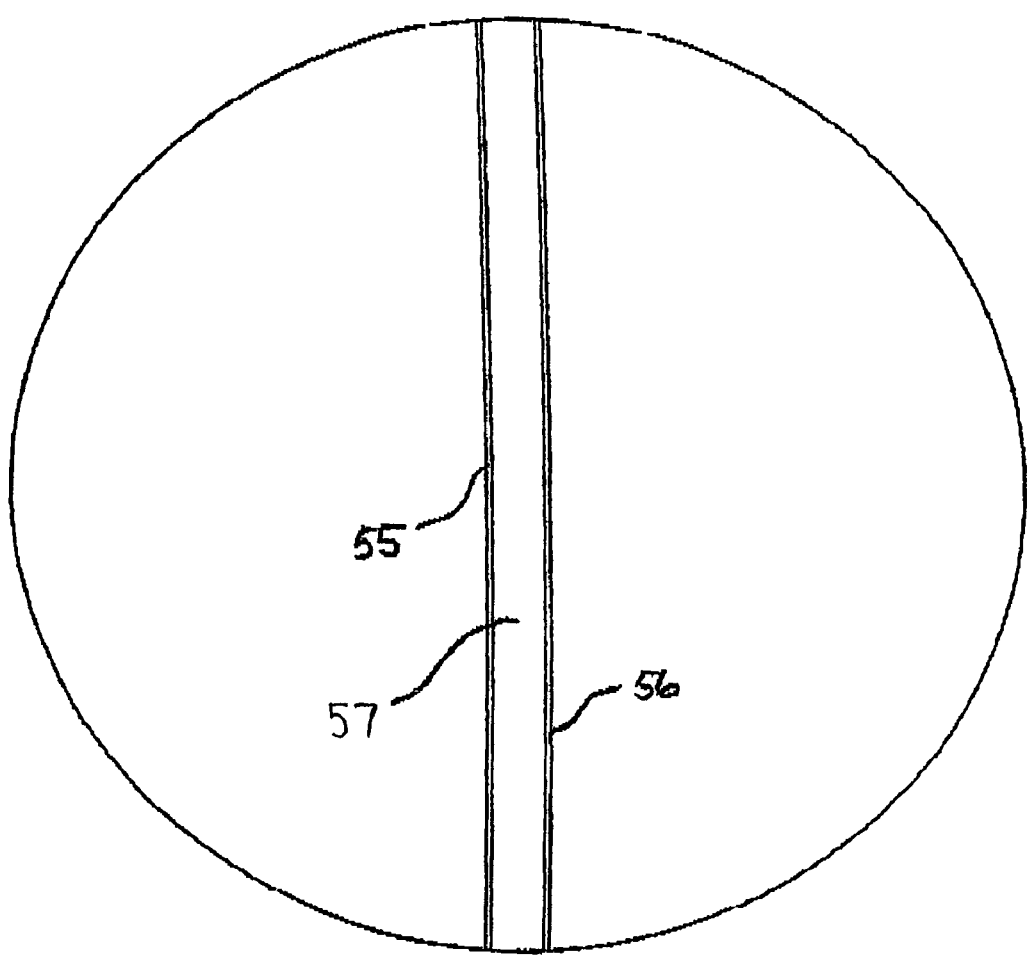
FIG. 10 is a schematic showing the inner skin, outer skin, and core.

This bonded assembly may utilize lightweight metal or non-metallic skins and honeycomb, plastic, foam, balsa wood, or other lightweight material as the core element. The preferred construction has a honeycomb or foam core 57 bonded in between two high-strength non-metallic skins 55, 56, with the skins made of high-strength fiber reinforcements in a resin matrix. FIG. 10 shows a schematic of the inner skin 55, outer skin 56, and core 57. The resin matrix is generally a plastic material, and the fiber reinforcement may be fiberglass, aramid, carbon fiber, ultra-high molecular weight polyethylene sold under the trademark "SPECTRA", or similar fiber materials with a high strength-to-weight ratio, from which the term fiber-reinforced plastics (FRP's) is derived to describe what are more commonly known as "composites."

Composite construction covers a dramatic range of strength from low-grade non-structural materials, using short fibers or non-oriented fibers with inexpensive resins, to high strength and stiffness properties utilizing woven cloth in a high performance resin system. It is a key feature of this chassis design that the body panels are structural elements, which have high strength, and the preferred embodiment utilizes this type of construction. The common materials for structural composites in commercial applications include fiberglass, aramid, and carbon fiber cloths and tapes in a vinyl ester or epoxy resin matrix. These materials each have different mechanical properties in terms of tensile strength and stiffness, compressive strength and stiffness, impact resistance, etc. All common FRP materials are also corrosion and moisture-resistant when properly constructed, ensuring a long lifespan without the need for exotic coatings.

By utilizing selected combinations of these materials with these individual properties, the body panels for use in this motor bus chassis can achieve the desired performance characteristics of extremely high strength in the plane of the panel or at a right angle, high stiffness, and good impact strength and durability. Proper design and construction of these structural composite panels provides all the necessary strength and stiffness to serve as the sole self-supporting structure of the vehicle chassis, even for intensive urban service, without the need for structural frame members to connect the front and the rear suspension.

Figure 6:
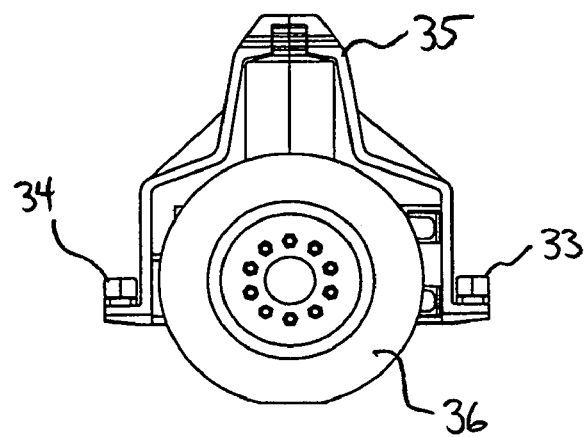
FIG. 6 is a side view of the front suspension and steering module.

Low-floor vehicles similar to the motor bus in FIG. 1 typically have rear-mounted engines and non-driven wheels at the front of the vehicle. The drawing in FIG. 6 is a side view of the preferred embodiment which shows the four mounting points 33, 34 where the non-powered suspension module is secured in the chassis with large bolts or pins. The strut tower section 35 of the main module frame member is visible, along with the suspended wheel assembly 36.

Figure 7:
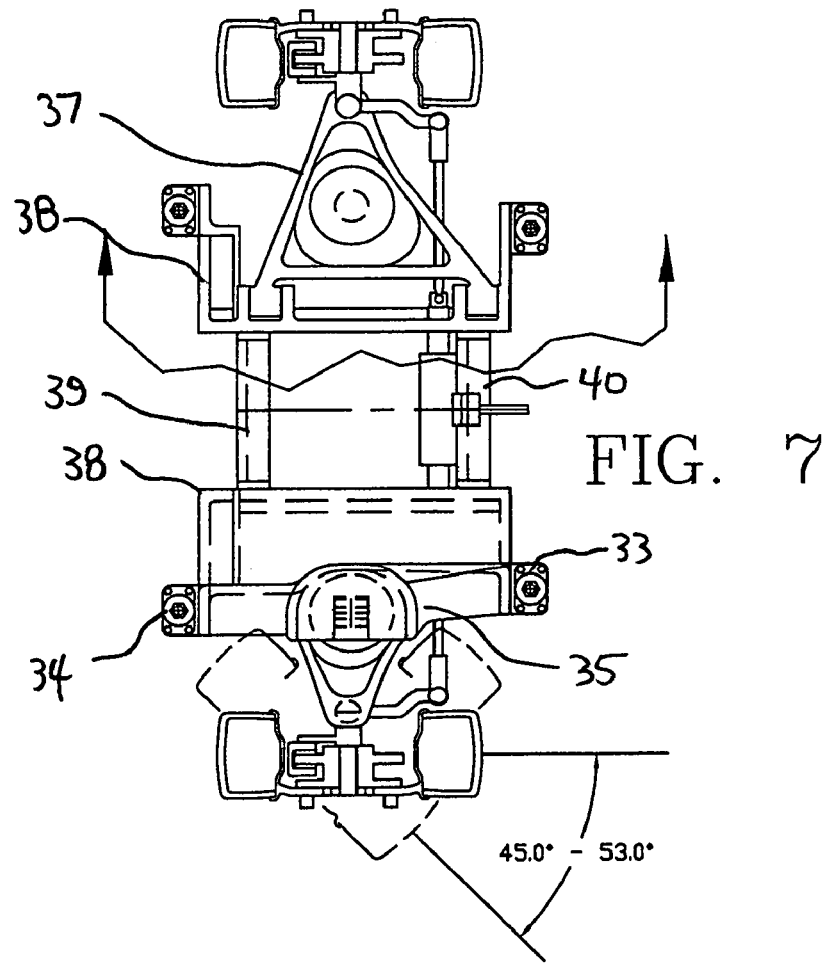
FIG. 7 is a top view of the front suspension and steering module.

Another key feature of this design is visible in FIG. 7 showing the wide spacing between the vertical strut towers 35. This characteristic provides space between the suspension assemblies for driver seating at front, and passenger seating or an aisle at the rear.

In the details shown, the two suspension arms 37 on each side mount to the longitudinal frame member 38 which is the primary load-bearing element of the front suspension module. This frame member may be manufactured by casting, forging, fabrication, or bolted from subcomponents to provide suspension arm mounts and front and rear mounting points to affix to the vehicle chassis.

The longitudinal elements define the position of the raised floor, which accommodates this front suspension module. The longitudinal beam 38 is integrated to the strut tower section 35 as a single component as shown in the details, or they may be fastened together from individual parts. The longitudinal beams on the left and right-sides are connected by two crossmembers 39, 40, which are fastened by bolting or a suitable alternative method. In this manner the four frame elements define a rigid frame which is suitable for carrying the loads of this application.

The crossmember beams 39, 40 connecting the two longitudinal beams 38 may be the same height as shown or may be constructed to provide a short beam height in between the longitudinals, thus allowing a low-floor walkway through the independent suspension. This configuration is a unique innovation for a motor bus, which is required to build the vehicle shown in FIG. 2.

Figure 8:
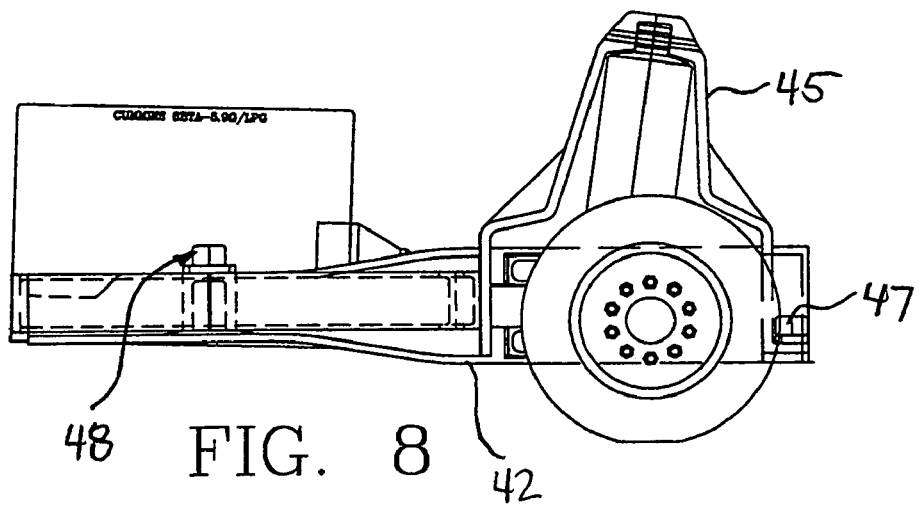
FIG. 8 is a side view of the rear engine, drivetrain and suspension module.
Figure 9:
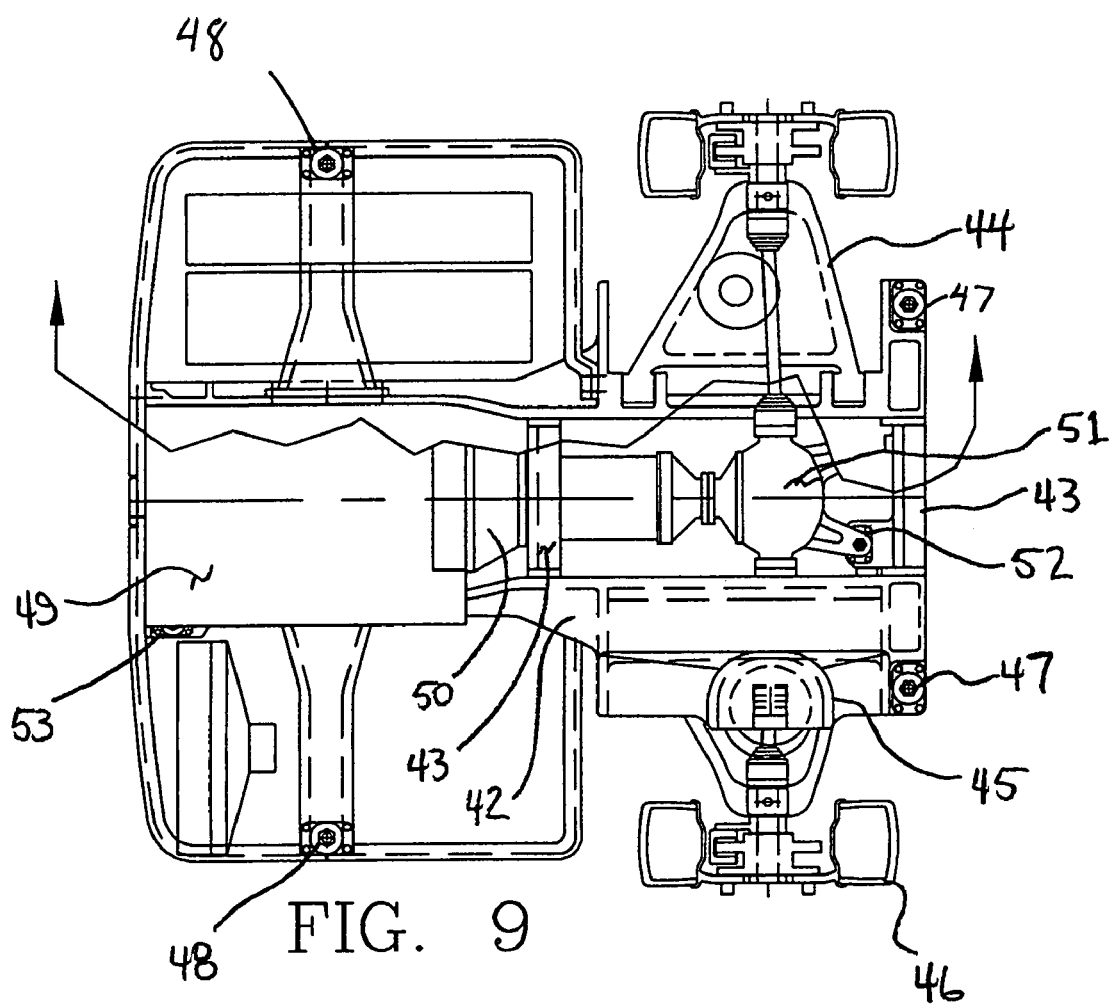
FIG. 9 is a top view of the rear engine, drivetrain, and suspension module.

The drawing in FIG. 8 shows a side view of the rear powertrain module, which includes the engine, drivetrain, suspension, and all running gear as a single integrated sub-assembly. This configuration provides known but previously unrealized potential for significant cost savings during initial manufacture and subsequent long-term servicing.

As with the front suspension module, the powertrain module has two longitudinal frame members 42, which are connected by two or more crossmembers 43, through bolting or other suitable means to form a rigid structural frame. This frame carries all of the horizontal loads imparted by the suspension arms 44. The longitudinal members also carry the vertical loads from the wheel assembly 46, carried by strut towers 45 in the embodiment shown, which may be an integral part of the longitudinal members or may be attached as an assembly. The powertrain module has mounting points at the front 47 and at the rear 48 to attach the module to the vehicle chassis with bolts or pins.

The engine 49, transmission 50, and rear drive axle 51 are bolted to form a rigid sub-assembly lacking the traditional flexibly-coupled driveshaft, which are collectively mounted to the rear module frame members with rubber-isolated mounts 52, 53. Another variation utilizes a fixed driveshaft contained within a driveshaft tube, which in turns rigidly couples the engine and transmission to the differential unit.

The transmission unit and differential gear unit may be configured in the conventional arrangement as shown in the drawings with the transmission between the engine and differential gear to make use of more standard drivetrain components. The transmission unit may also be connected or integrated with a more specialized differential assembly which places the differential and drive gears in between the engine and transmission, thus moving the rear axle centerline closer to the rear of the vehicle and further increasing the useable floorspace of the vehicle.

Another embodiment includes a suspended axle module consisting of metal frame members which define a structural frame, from which a wheel or a pair of wheels is attached, with optional steering and braking capability, wherein the longitudinal, lateral and rotational forces are transmitted from the wheels to the frame through pivoting members and the vertical loads are carried by spring and damper elements, whereby the entire suspended axle module is mounted to the vehicle chassis at two or more load-bearing points to facilitate improved installation and removal of the axle assembly from the vehicle.

Another embodiment includes a suspended powertrain module of similar construction with a metal structural frame, suspended wheels, spring and damper elements supporting the vertical wheel loads, optional steering and braking capability, and a motor or engine supplying rotational power to the driven wheels, utilizing a gear reduction or power transmission unit as necessitated by the application, whereby the entire suspended powertrain module is mounted to the vehicle chassis at two or more load-bearing points to facilitate improved installation and removal of the powertrain and axle assembly from the vehicle.

As used herein the specification, "a" or "an" may mean one or more. As used herein in the claim(s), when used in conjunction with the word "comprising", the words "a" or "an" may mean one or more than one. As used herein "another" may mean at least a second or more.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

What is claimed is:

1. A rectangular vehicle structure, comprising:
    a rectangular frame that includes
        first and second upper longitudinal members configured with two mounting surfaces that extend substantially the length of each of said first and second upper longitudinal frame members,
        first and second lower longitudinal members configured with a mounting surface that extends substantially the length of each of said first and second lower longitudinal frame members,
        first and second forward vertical members,
        first and second aft vertical members,
        first and second forward lateral members, and
        first and second aft lateral members, wherein the vertical and lateral members are configured to support the longitudinal members in a spaced apart parallel configuration; and
    a plurality of side panels secured to said rectangular frame, wherein said side panels have an inner skin, an outer skin and a core disposed therebetween and flanges that are adapted to be received on the mounting surfaces of said upper and lower longitudinal frame members.

2. The rectangular vehicle structure of claim 1, wherein each of said side panels is secured on at least three sides to said rectangular frame.

3. The rectangular vehicle structure of claim 2, wherein said core of at least one of said side panels comprises a honeycomb structure.

4. The rectangular vehicle structure of claim 2, wherein said core of at least one of said side panels comprises balsa wood or foam.

5. The rectangular vehicle structure of claim 2, wherein said outer skin is a composite comprising a resin matrix reinforced with structural fiber.

6. The rectangular vehicle structure of claim 5, wherein said structural fiber is selected from the group consisting of fiberglass, aramid, polyethylene, carbon, and any combination thereof.

7. The rectangular vehicle structure of claim 6, wherein said resin matrix comprises vinyl ester.

8. The rectangular vehicle structure of claim 6, wherein said resin matrix comprises an epoxy.

9. The rectangular vehicle structure of claim 6, wherein said first and second upper longitudinal frame members are substantially straight with substantially constant cross-sections.

10. The rectangular vehicle structure of claim 9, wherein said side panels are substantially flat.

11. The rectangular vehicle structure of claim 9, wherein said side panels are secured to said rectangular frame with structural adhesive.

12. The rectangular vehicle structure of claim 9, wherein said side panels are further secured to said rectangular frame using mechanical fasteners.

13. The rectangular vehicle structure of claim 11, wherein said first and second upper longitudinal frame members are made from a material selected from the group consisting of aluminum, steel, stainless steel, and non-metallic material.

14. A rectangular vehicle structure of claim 13 wherein said rectangular frame has at least one attachment point for a suspension.

15. A rectangular vehicle structure of claim 14 wherein said rectangular frame has at least one attachment point for a powertrain.

16. A bus comprising,
a rectangular frame structure;
a plurality of side panels secured on at least three sides to said rectangular frame structure,
wherein said side panels have an inner and outer skin and a core positioned therebetween and a flange;
a suspension secured to said rectangular frame structure; and
a powertrain secured to said rectangular frame structure.

17. The bus of claim 16, wherein the rectangular frame structure includes upper longitudinal members configured with two mounting surfaces that extend substantially the entire length thereof.

18. The bus of claim 17, wherein said side panels are secured to said upper longitudinal members using structural adhesive between the flanges of said side panels and the mounting surfaces of said upper longitudinal members.

19. The bus of claim 18, wherein said side panels are further secured to said upper longitudinal members using mechanical fasteners.

20. The rectangular vehicle structure of claim 18, wherein said outer skin is a composite comprising a resin matrix reinforced with structural fiber.

21. The bus of claim 20, wherein said structural fiber is selected from the group consisting of fiberglass, aramid, polyethylene, carbon, and any combination thereof.

22. The bus of claim 20, wherein said resin matrix comprises vinyl ester or epoxy.

23. The bus of claim 21, wherein said core comprises a honeycomb structure.

24. The bus of claim 21, wherein said core comprises balsa wood or foam.

25. The bus of claim 21 wherein said rectangular frame structure includes attachment points for securing said suspension and attachment points for securing said powertrain.

26. A bus frame comprising,
a plurality of body panels configured to form a rectangular structure;
a forward sub-frame connected to said rectangular structure, wherein said forward sub-frame comprises suspension attachment points and two longitudinal forward sub-frame members positioned in a spaced apart relation and connected to two lateral forward sub-frame members; and
an aft sub-frame connected to said rectangular structure, wherein said aft sub-frame comprises a rearward crossmember connected to two aft longitudinal inner subframe members.

27. The bus frame of claim 26, wherein the aft sub-frame further comprises powertrain and suspension attachment points.

28. The bus frame of claim 27, wherein said body panels are bonded assemblies comprising two skins and a core disposed therebetween.

29. The rectangular vehicle structure of claim 28, wherein said skins are comprised of a resin matrix reinforced with structural fiber.

30. The bus frame of claim 29, wherein said structural fiber is selected from the group consisting of fiberglass, aramid, polyethylene fiber, carbon fiber, and any combination thereof.

31. The bus frame of claim 30, wherein said resin matrix comprises vinyl ester or epoxy.

32. The bus frame of claim 30, wherein said core comprises a honeycomb structure.

33. The bus frame of claim 30, wherein said core comprises balsa wood or foam.

34. The bus frame of claim 30, wherein the rectangular structure derives substantially all of its structural strength from said plurality of body panels.

* * * * *